United States Patent
Yasuda

(10) Patent No.: US 11,190,688 B2
(45) Date of Patent: Nov. 30, 2021

(54) IMAGE BLUR CORRECTION DEVICE, METHOD FOR CONTROLLING SAME, AND IMAGING APPARATUS

(71) Applicant: CANON KABUSHIKI KAISHA, Tokyo (JP)

(72) Inventor: Ryuichiro Yasuda, Ageo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/600,779

(22) Filed: Oct. 14, 2019

(65) Prior Publication Data

US 2020/0120281 A1     Apr. 16, 2020

(30) Foreign Application Priority Data

Oct. 16, 2018   (JP) .............................. JP2018-194836

(51) Int. Cl.
*H04N 5/232*  (2006.01)

(52) U.S. Cl.
CPC ....... *H04N 5/23264* (2013.01); *H04N 5/2328* (2013.01); *H04N 5/23258* (2013.01); *H04N 5/23261* (2013.01)

(58) Field of Classification Search
None
See application file for complete search history.

(56) References Cited

U.S. PATENT DOCUMENTS

| | | | |
|---|---|---|---|
| 7,668,447 B2 | 2/2010 | Yamazaki | |
| 2007/0166021 A1* | 7/2007 | Yamazaki | H04N 5/23248 396/55 |
| 2011/0013031 A1* | 1/2011 | Miyasako | G02B 27/646 348/208.99 |
| 2011/0102612 A1* | 5/2011 | Iwata | G03B 5/00 348/208.11 |
| 2011/0158620 A1* | 6/2011 | Kanayama | G03B 5/00 396/55 |
| 2012/0207457 A1* | 8/2012 | Miyasako | G03B 5/00 396/55 |

(Continued)

FOREIGN PATENT DOCUMENTS

| | | |
|---|---|---|
| JP | 2007-189478 A | 7/2007 |
| JP | 2012-048138 A | 3/2012 |

*Primary Examiner* — Twyler L Haskins
*Assistant Examiner* — Wesley J Chiu
(74) *Attorney, Agent, or Firm* — Cowan, Liebowitz & Latman, P.C.

(57) ABSTRACT

An image blur correction device includes a motion detection unit and detects a motion of panning, tilting, and camera shake. A motion determination unit determines a motion of an imaging apparatus based on an output of the motion detection unit. A high-pass filter (HPF) removes a low-frequency component from the output of the motion detection unit and a low-pass filter (LPF) removes a high-frequency component from an output of the HPF. A swing-back time period detection unit detects a period of time during which swing-back occurs based on the output of the LPF and the output of the motion determination unit. A gain control unit controls a gain to be multiplied by the output of the LPF based on the output of the detection unit and the output of the motion determination unit. A subtraction processing unit subtracts an output of the gain control unit from the output of the HPF.

15 Claims, 7 Drawing Sheets

(56) References Cited

U.S. PATENT DOCUMENTS

| | | | |
|---|---|---|---|
| 2013/0004151 A1* | 1/2013 | Wakamatsu | H04N 5/23287 396/55 |
| 2015/0042827 A1* | 2/2015 | Noguchi | H04N 5/23258 348/208.2 |
| 2015/0172546 A1* | 6/2015 | Takeuchi | H04N 5/23258 348/208.6 |
| 2015/0172548 A1* | 6/2015 | Takeuchi | H04N 5/23258 348/208.6 |
| 2015/0256753 A1* | 9/2015 | Shibata | G06T 5/002 348/208.3 |
| 2016/0255273 A1* | 9/2016 | Wakamatsu | H04N 5/23248 348/208.99 |
| 2016/0316123 A1* | 10/2016 | Wakamatsu | H04N 5/23219 |
| 2017/0163879 A1* | 6/2017 | Tsuji | H04N 5/23267 |

* cited by examiner

IMAGE BLUR CORRECTION DEVICE, METHOD FOR CONTROLLING SAME, AND IMAGING APPARATUS

BACKGROUND OF THE INVENTION

Field of the Invention

The present invention relates to a technique that corrects the image blur of an image caused by a camera shake or the like.

Description of the Related Art

Motions of an imaging apparatus includes a motion that is not intentionally performed by a photographer, such as camera shake and a panning or tilting motion (hereinafter, referred to as "panning or the like") that is intentionally performed by the photographer. In order to detect the motion of the imaging apparatus to perform image blur correction, it is necessary to distinguish between a motion that is not intentionally performed by the photographer and a motion that is intentionally performed by the photographer. The motion intentionally performed such as panning or the like can be recognized as a large motion having a low-frequency, and control is performed so as to prevent the motion from being included in the calculation for an amount of image blur correction.

Japanese Unexamined Patent Application, First Publication No. 2012-048138 discloses a method for dynamically changing a cutoff frequency of a high-pass filter (HPF) for detecting an amount of camera shake in accordance with the start and end of panning or the like. After the panning or the like starts, the cutoff frequency of the HPF is raised so that the motion of panning or the like is not detected as the motion of camera shake, and if the panning or the like approaches the end, control that lowers the cutoff frequency to enhance the camera shake correction performance is performed In this connection, if the above control is performed in a case of making the camera shake correction and the panning control compatible, a phenomenon may occur in which an angle of view returns to a direction opposite to a direction of panning or the like at the end of panning or the like (swing-back). The reason for causing the swing-back is that a low-frequency motion component is no longer restricted by lowering the cutoff frequency at the end of panning or the like, and a motion component in a direction opposite to a direction of panning or the like appears in an HPF output. If the panning or the like is completed and the low-frequency motion component disappears in the motion of the imaging apparatus, an image blur correction member returns to the initial position, resulting in the motion appearing on an image as swing-back.

In order to eliminate the swing-back based on signal processing, there is a method for determining the start and end of the swing-back and subtracting a swing-back component from a correction amount of an image blur correction control system during the swing-back time period to remove the swing-back component. In the imaging apparatus disclosed in Japanese Unexamined Patent Application, First Publication No. 2007-189478, the swing-back can be suppressed by removing a low-frequency component.

In the conventional imaging apparatus, there is a possibility that the swing-back will occur after panning or the like due to the influence of the HPF included in the image blur correction control unit. In the method for suppressing the swing-back by removing a low-frequency component of a shake detection signal, components such as camera shake included in the low-frequency component are also removed, so that there is a concern that the image blur correction performance is lowered.

SUMMARY OF THE INVENTION

The present invention achieves both the correction for swing-back that occurs based on signal processing and image blur correction.

A device according to the embodiment of the present invention is an image blur correction device that corrects the image blur of an image comprising: a controller having a processor that executes instructions stored in a memory or having circuitry, the controller being configured to function as: a first filtering unit configured to reduce a low-frequency component of an output of a detector that detects a motion of an apparatus provided with the image blur correction device; a second filtering unit configured to reduce a high-frequency component of the output of the first filtering unit; a detection unit configured to detect a period of time during which a swing-back motion based on signal processing is generated, by using the output of the second filtering unit; a gain control unit configured to determine a gain based on an output of the detection unit, multiply the output of the second filtering unit by the gain, and output the result; a subtraction processing unit configured to subtract an output of the gain control unit from the output of the first filtering unit; and a control unit configured to perform control that corrects the image blur in accordance with an output of the subtraction processing unit.

Further features of the present invention will become apparent from the following description of exemplary embodiments with reference to the attached drawings.

DESCRIPTION OF THE EMBODIMENTS

Hereinafter, each embodiment of the present invention will be described in detail with reference to the drawings. Although a motion during a panning operation is shown as a typical example of a motion intentionally performed by a photographer, the control and processing below can be applied to tilting as well.

First Embodiment

Figure 1:
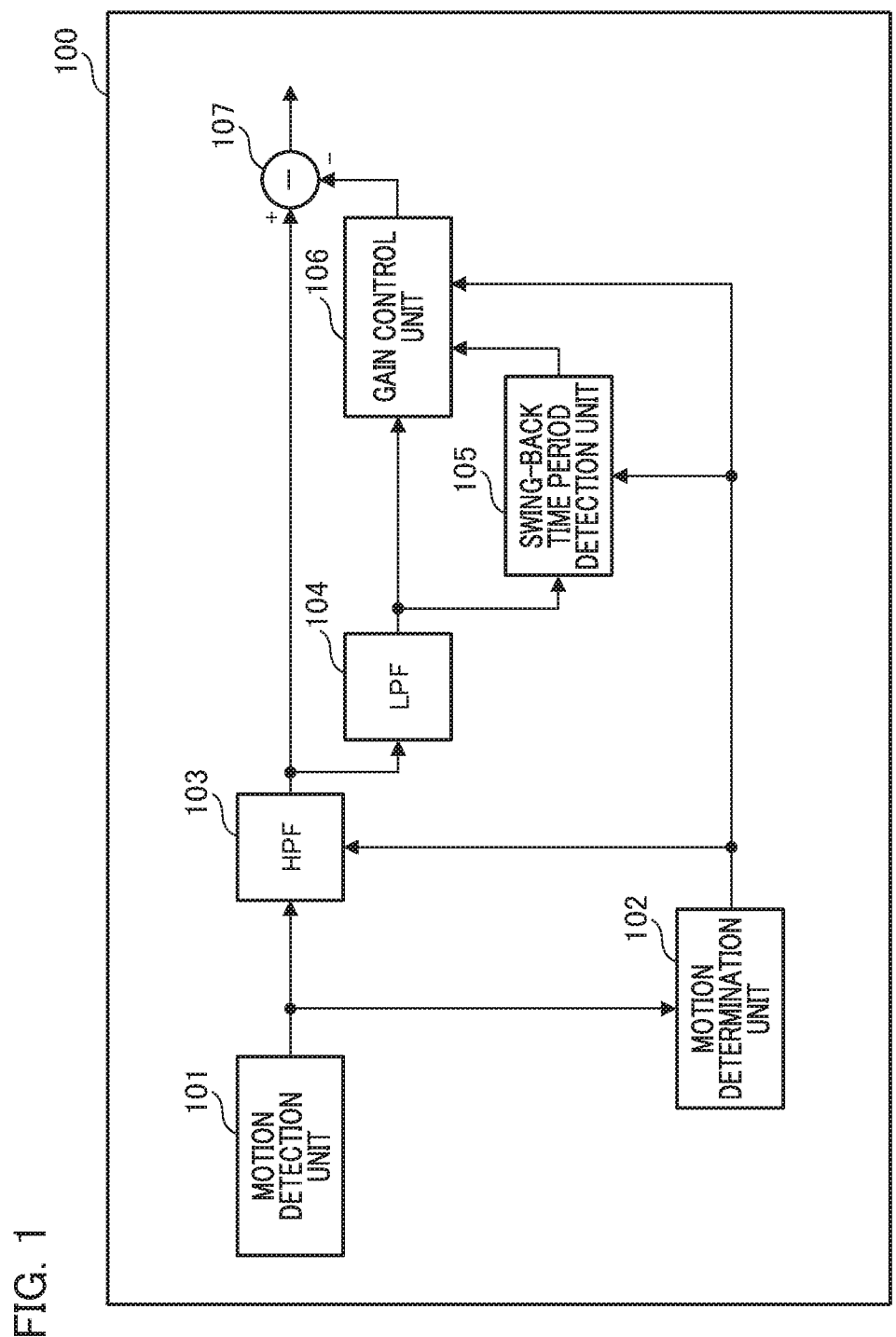
FIG. 1 is a block diagram illustrating an apparatus configuration according to the first embodiment of the present invention.

FIG. 1 is a block diagram illustrating a configuration of an image blur correction device 100 of the present embodiment, and illustrates components related to the present invention in an imaging apparatus. A motion detection unit 101 detects a motion occurring in the imaging apparatus provided with the image blur correction device 100. This motion is, for example, a motion such as panning or the like and a camera shake. A swing-back motion appears as a result for signal processing, and is not a physical motion generated in the actual imaging apparatus. The motion detection unit 101 outputs a detection signal of motion information of the imaging apparatus (hereinafter, referred to as a "motion signal") to a motion determination unit 102 and a high-pass filter (HPF) 103.

The motion determination unit 102 determines panning or the like based on the motion signal from the motion detection unit 101 and calculates a speed or acceleration of panning or the like. The motion determination unit 102 outputs a determination signal and the like to the HPF 103, a swing-back time period detection unit 105 (hereinafter, referred to as a "period detection unit"), and a gain control unit 106.

The HPF 103 removes or reduces a low-frequency component from the motion signal detected by the motion detection unit 101. At this time, control that changes a cutoff frequency of the HPF 103 is performed based on the determination result of the motion determination unit 102. The HPF 103 outputs a signal on which filtering processing has been performed to a low-pass filter (LPF) 104 and a subtraction processing unit 107.

The LPF 104 removes or reduces a high-frequency component in the output signal of the HPF 103. The LPF 104 outputs a signal on which filtering processing has been performed to the period detection unit 105 and the gain control unit 106.

The period detection unit 105 detects a period of time during which a swing-back component appears in the output signal of the LPF 104. Information indicating the determination result of the motion determination unit 102 is used for detecting the swing-back time period. The swing-back component is a low-frequency component during a detected period of time. The swing-back time period means a time period during which the swing-back component appears. The period detection unit 105 outputs a detection signal during the swing-back time period to the gain control unit 106.

The gain control unit 106 multiplies the output signal of the LPF 104 by a gain based on the detection result of the period detection unit 105 and the determination result of the motion determination unit 102, and outputs the result to the subtraction processing unit 107. The subtraction processing unit 107 subtracts the output signal of the gain control unit 106 from the output signal of the HPF 103. The output signal of the subtraction processing unit 107 is transmitted to a correction control unit. The correction control unit controls an image blur correction member so as to cancel the motion of the camera shake or the like. Examples of the image blur correction member include a correction lens such as a shift lens that configures an imaging optical system, and a moving member of an imaging element in a device provided with a driving mechanism unit of a movable imaging element. Alternatively, the examples of the image blur correction member include a gimbal mechanism that can be driven and controlled by an instruction from the imaging apparatus and an electric cloud platform that can be automatically controlled. Note that although the present embodiment shows an example of a configuration in which a predetermined frequency component is reduced by filtering processing by the HPF 103 and the LPF 104, a configuration in which the filtering processing is executed by using a band-pass filter (BPF) may be used. Additionally, in the present embodiment, the motion detection unit 101 detects a motion of the imaging apparatus by using, for example, an angular velocity sensor, and a controller configured by at least one CPU functions as the motion determination unit 102, the HPF 103, the LPF 104, the period detection unit 105, the gain control unit 106, the subtraction processing unit 107, and a correction control unit. Additionally, the motion detection unit 101 may be provided in an accessory such as an interchangeable lens attached to the imaging apparatus.

Figure 2:
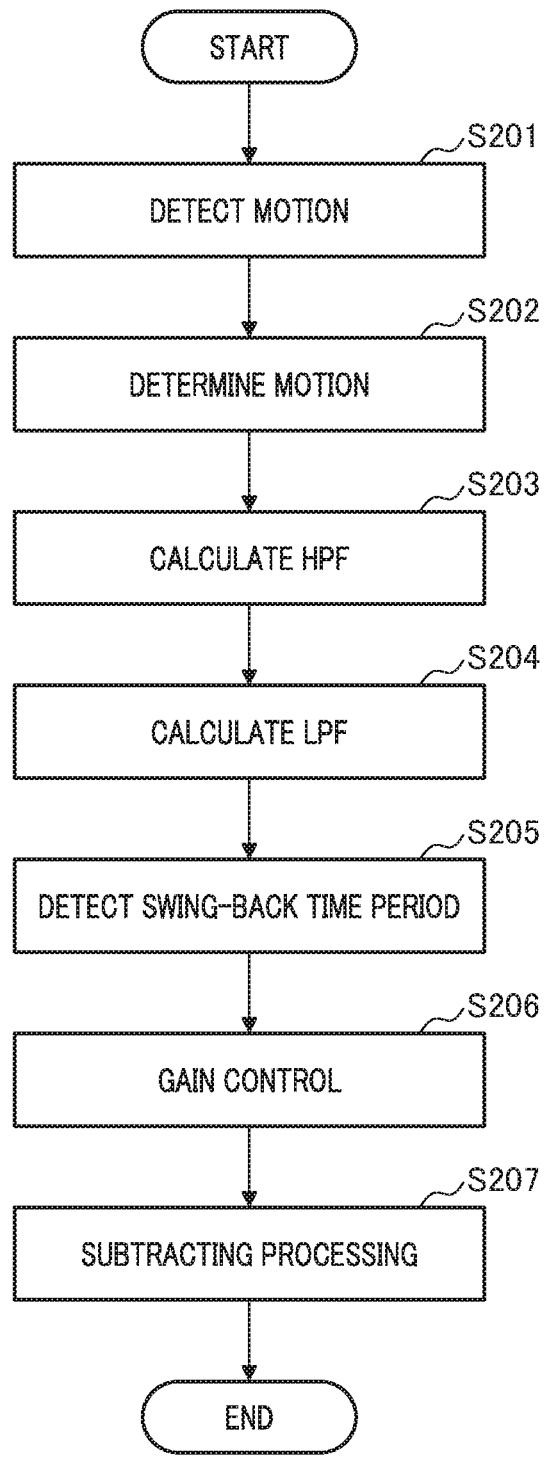
FIG. 2 is a flowchart that illustrates image blur correction processing according to the first embodiment.
Figure 3:
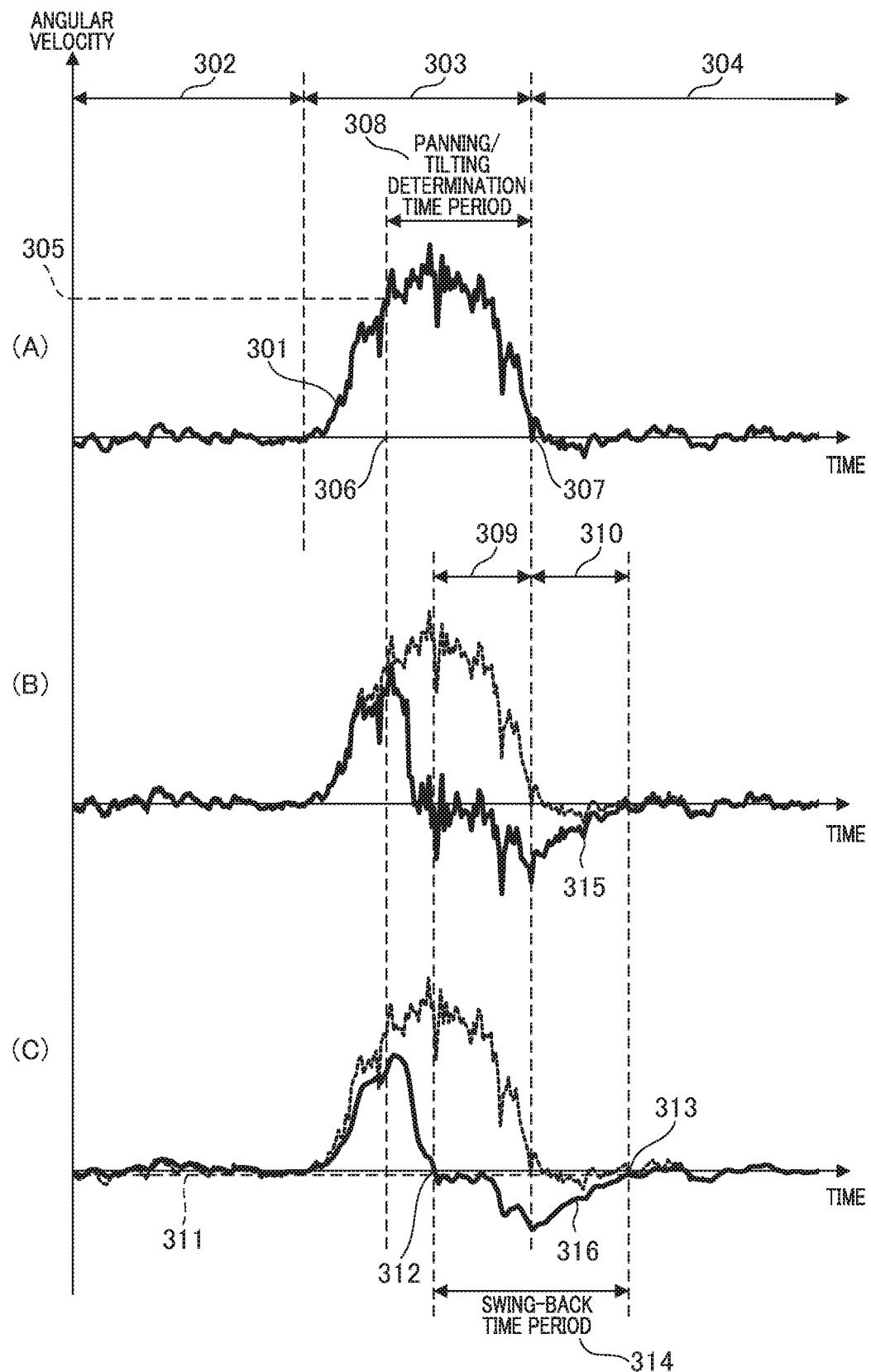
FIG. 3 illustrates a time variation of a motion component.

With reference to FIGS. 2 and 3, processes performed by the image blur correction device 100 will be described. FIG. 2 is a flowchart illustrating the flow of processes. FIG. 3 illustrates a time variation of the output signal of each unit, a panning period of time, and a swing-back period of time. In FIG. 3, the horizontal axis represents a time axis and the vertical axis represents an angular velocity. FIG. 3 illustrates an example of the time variation of the output signal of the motion detection unit 101, the HPF 103, and the LPF 104 during panning (or tilting) operation in the positive direction of the angular velocity signal, in order from top to bottom. A graph line 301 shown in the upper part in FIG. 3 shows a time variation of the angular velocity information, and, in a time period 302, only a camera shake motion occurs. In a time period 303 following the time period 302, a panning motion occurs, and in a time period 304 following the time period 303, only the camera shake motion occurs again.

In step S201 of FIG. 2, the motion detection unit 101 detects a motion of the imaging apparatus and outputs a motion signal. The motion detection unit 101 is provided with, for example, an angular velocity sensor, where the motion signal in this case is an angular velocity signal. In step S202, the motion determination unit 102 performs panning determination based on a motion signal acquired from the motion detection unit 101 and outputs an angular velocity when it is determined that panning is being performed. With reference to FIG. 3, determination processing of an angular velocity signal during panning operation will be described.

In FIG. 3, a predetermined first threshold value is shown by a broken horizontal line 305, and a time 306 is a time when the angular velocity exceeds the first threshold. That is, the motion determination unit 102 determines that the time 306 is the start time of the panning operation. A time 307 that is subsequent to the time 306 is a time when the angular velocity has fallen below a predetermined second threshold. The motion determination unit 102 determines that the time 307 is the end time of the panning operation, and determines that the period of time from time 306 to time 307 is a panning/tilting determination time period 308. The second threshold may be set to a value that is the same as the first threshold, or may individually be set to a value (for example, a value such as zero) that is different from the first threshold. For example, there is a method for determining panning or the like by using an angular acceleration signal that is a differential signal of an angular velocity signal, or by using a motion vector acquired from a video image, and any method can be adopted.

In step S203, HPF calculation is performed. The HPF 103 removes or reduces a low-frequency component of the motion signal output from the motion detection unit 101. An offset component included in the output signal of a gyro sensor or the like is removed. The cutoff frequency of the HPF 103 is changed based on the determination result of the motion determination unit 102. An example of controlling the cutoff frequency is explained, where, during a period of time for panning operation that has been determined, a process of setting a cutoff frequency high is performed in order to restrict a large motion at a low-frequency. That is, a restriction is performed so as not to output a large motion at a low-frequency. At this time, the motion of the camera shake is no longer restricted by an amount of increase of the cutoff frequency of the HPF 103, so that, in particular, the effect for correcting the camera shake at a low-frequency is weakened. For example, it is assumed that the cutoff frequency is raised up to 10 Hz based on the determination about the start of panning. The typical camera shake motion is within the range of a band approximately 1 to 10 Hz. The motion in this band is eliminated by increasing the cutoff frequency of the HPF 103, so that this case is removed from the control of the image blur correction. Specifically, the anti-shake (image blur correction) effect may be lowered.

In order to cope with this drawback, during a panning operation, control that dynamically changes the cutoff frequency of the HPF 103 in accordance with the magnitude of the motion signal is performed. Specifically, the cutoff frequency of the HPF 103 is gradually lowered as the panning operation approaches the end, so that the control is performed so as not to be lower the effect of image blur correction as much as possible. An example of the output signal of the HPF 103 upon a change of the cutoff frequency is shown by a graph line 315 with a solid line in the middle part of FIG. 3.

Swing-back can be generated by changing the cutoff frequency of the HPF 103. If the cutoff frequency of the HPF 103 is made lower toward the end of panning operation, a change in the low-frequency component of the motion signal may appear in the output signal of the HPF 103 during a time period 309 included in the panning period of time. In a case where this change in the low-frequency component appears in the output signal of the HPF 103, an undershoot motion is generated in the time period 309. Subsequently, at the end of the panning motion, the low-frequency motion component disappears from the motion signal, and the output signal of the HPF 103 approaches near zero in a time period 310 that is after the time period 309. After the end of the panning, the motion in the time period 310 appears on the screen as a motion like swinging-back to a direction opposite to the advancing direction of the panning.

In FIG. 2, the LPF calculation is performed in step S204 that is next to step S203. The LPF 104 removes or reduces a high-frequency component from the output signal of the HPF 103, and extracts a swing-back component. The swing-back component is a low-frequency component in the time period 309 and the time period 310 in FIG. 3. In step S205, the period detection unit 105 detects a period of time (swing-back time period) during which the swing-back component appears in the output signal of the LPF 104 by using the determination result of the motion determination unit 102. A detailed description will be given with reference to a graph line 316 shown by a solid line on the lower part of FIG. 3.

The graph line 316 is an example of the time variation of the output signal of the LPF 104. A time 312 is the start time of a swing-back time period 314, and time 313 is the end time of the swing-back time period 314. A dashed horizontal line 311 indicates a predetermined threshold near zero.

During the panning period of a time determined by the motion determination unit 102, the time 312 that is the time when the sign of the output signal of the LPF 104 has been switched is detected as the start time of the swing-back time period. At the subsequent time 307, the motion determination unit 102 determines that panning has been completed.

The period detection unit 105 detects the time 313 when the magnitude (absolute value) of the output signal of the LPF 104 has fallen below the threshold (see 311) as the end time of the swing-back time period. The swing-back time period 314 is a period of time obtained by combining the time period 309 and the time period 310. Note that there is hysteresis processing as an example of a countermeasure in the case where the sign of the output signal of the LPF 104 is switched a plurality of times due to camera shake or the like in the determination of the start of the swing-back time period.

In step S206 of FIG. 2, based on the detection result of the period detection unit 105 and the determination result of the motion determination unit 102, the gain control unit 106 determines whether a priority should be given to the image blur correction or the swing-back correction depending on whether the motion caused by the camera shake or the motion caused by the swing-back is more conspicuous. The gain control unit 106 multiplies the output signal of the LPF 104 by a gain in accordance with the determination result. Increasing the gain value causes the correction component of the swing-back to increase, which means that a higher priority is given to the swing-back correction than the image blur correction. The gain control method will be described below with reference to FIGS. 4A and 4B.

In step S207, the subtraction processing unit 107 subtracts the output signal of the gain control unit 106 from the output signal of the HPF 103. The swing-back correction is performed by subtracting the swing-back component from the output signal of the HPF 103.

Figure 4A:
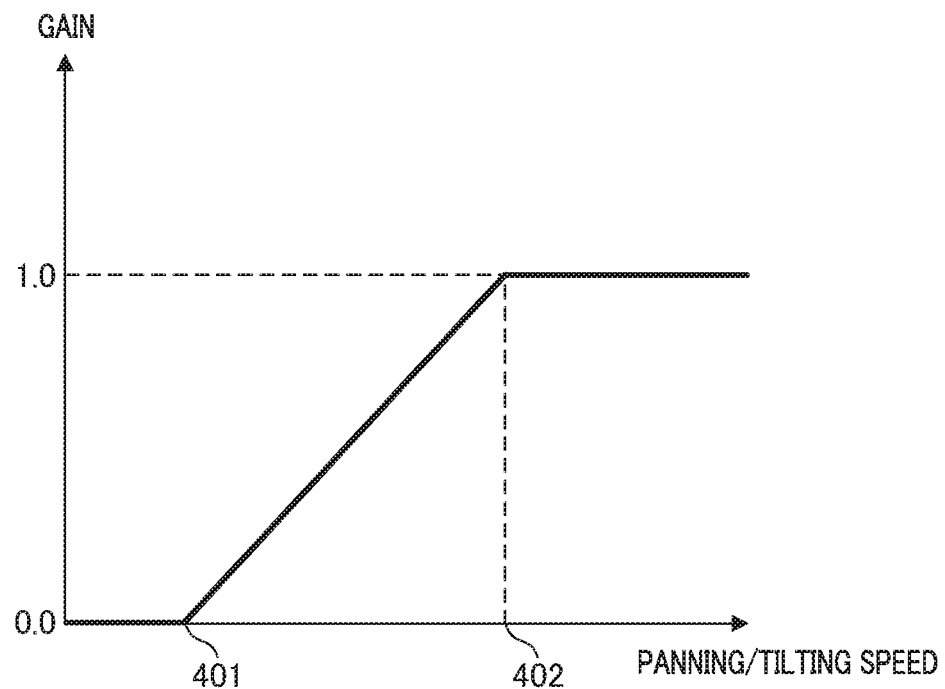
FIGS. 4A and 4B illustrate the relation between a speed, acceleration of panning or the like, and a gain.

FIG. 4A illustrates an example of association between the panning speed (or the tilting speed) and the gain (referred to as "G") during the swing-back time period. The horizontal axis represents a speed of panning or the like, and indicates a first threshold 401 and a second threshold 402 with respect to the speed. The second threshold 402 is larger than the first threshold 401. The vertical axis represents a gain value.

During a period of time excluding a swing-back time period (FIG. 3: swing-back time period 314), the swing-back does not occur, so that G=0 is set and the swing-back correction is not performed, and only the image blur correction is performed. In contrast, during the swing-back time period, gain multiplication is performed in the range $0 \leq G \leq 1$. As the motion signal increases and the panning speed increases, the motion of the undershoot of the output signal of the HPF 103 increases, and consequently the swing-back becomes more conspicuous than the camera shake. Hence, the motion determination unit 102 determines a panning speed, and the gain control unit 106 performs control so as to increase the gain value so that the effect of the swing-back correction is more pronounced as the panning speed increases. In the example of FIG. 4A, two thresholds 401 and 402 are provided, where if the panning speed is equal to or less than the first threshold value 401, G=0 is set. Additionally, if the panning speed is equal to or higher than the second threshold value 402, G=1 is set. The thresholds 401 and 402 may be determined depending on whether the motions caused by the camera shake or the motion caused by the swing-back is more conspicuous. In the interval from the first threshold 401 to the second threshold value 402, although a setting example in which the panning speed and the gain value change in a linear relation is shown, the present invention is not limited thereto, and the panning speed and the gain value may be associated with each other in a non-linear relation.

Additionally, the gain may be controlled by using the panning acceleration obtained by differentiating the panning speed output from the motion determination unit 102. In general, as the panning speed increases, the panning acceleration tends to change steeply. Therefore, the determination can be quickly performed by using the panning acceleration. The gain control method will be described with reference to FIG. 4B.

Figure 4B:
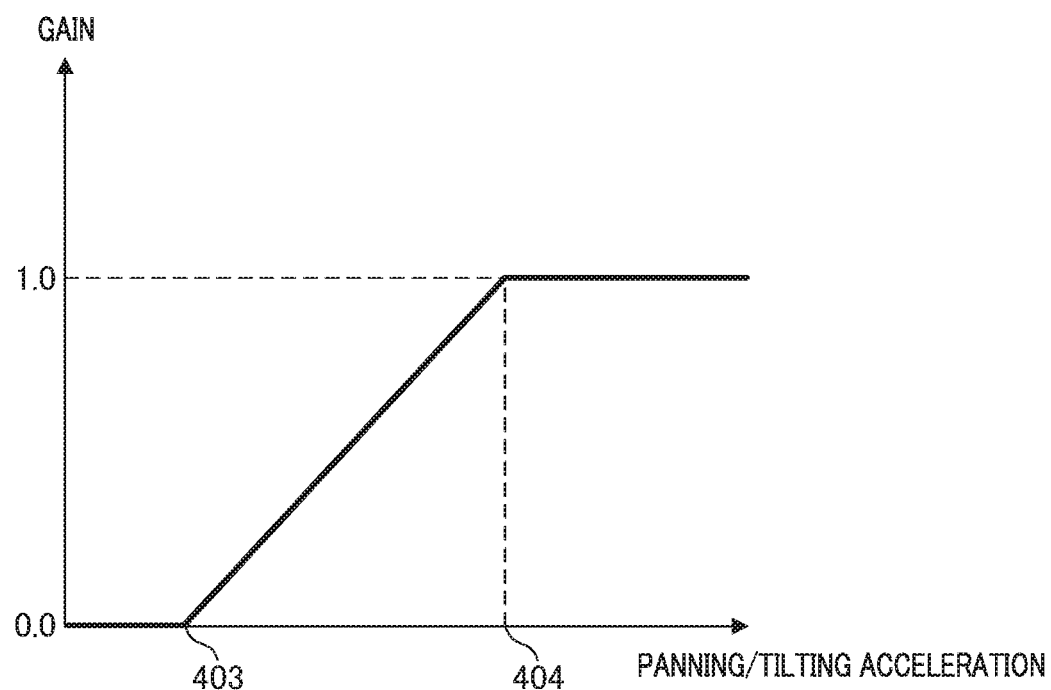

FIG. 4B illustrates an example of the association between the panning acceleration (or the tilting acceleration) and the gain G during the swing-back time period. The horizontal axis represents acceleration such as panning or the like and indicates a first threshold 403 and a second threshold 404 with respect to the acceleration. The second threshold 404 is larger than the first threshold 403. The vertical axis represents a gain value.

In a manner similar to the case of the panning speed, G=0 is set except for the swing-back time period, and the swing-back correction is not performed, but only the image blur correction is performed. During the swing-back time period, a gain multiplication is performed in a range 0≤G≤1. Based on the determination result of the panning acceleration, control that increases a gain value is performed so as to exhibit the effect of the swing-back correction more as the acceleration increases. In the example of FIG. 4B, G=0 is set if the panning acceleration is equal to or less than the first threshold 403, and G=1 is set if the panning acceleration is equal to or more than the threshold 404. The thresholds 403 and 404 are determined depending on which motion is more conspicuous, the motion due to the camera shake or the motion due to the swing-back. In the interval from the first threshold 403 to the second threshold 404, although a setting example in which the panning acceleration and the gain value change in a linear relation is shown, both may be associated with each other in a non-linear relation. According to the present embodiment, in performing an operation such as panning, the swing-back correction and the image blur correction can be made compatible.

Second Embodiment

Figure 5:
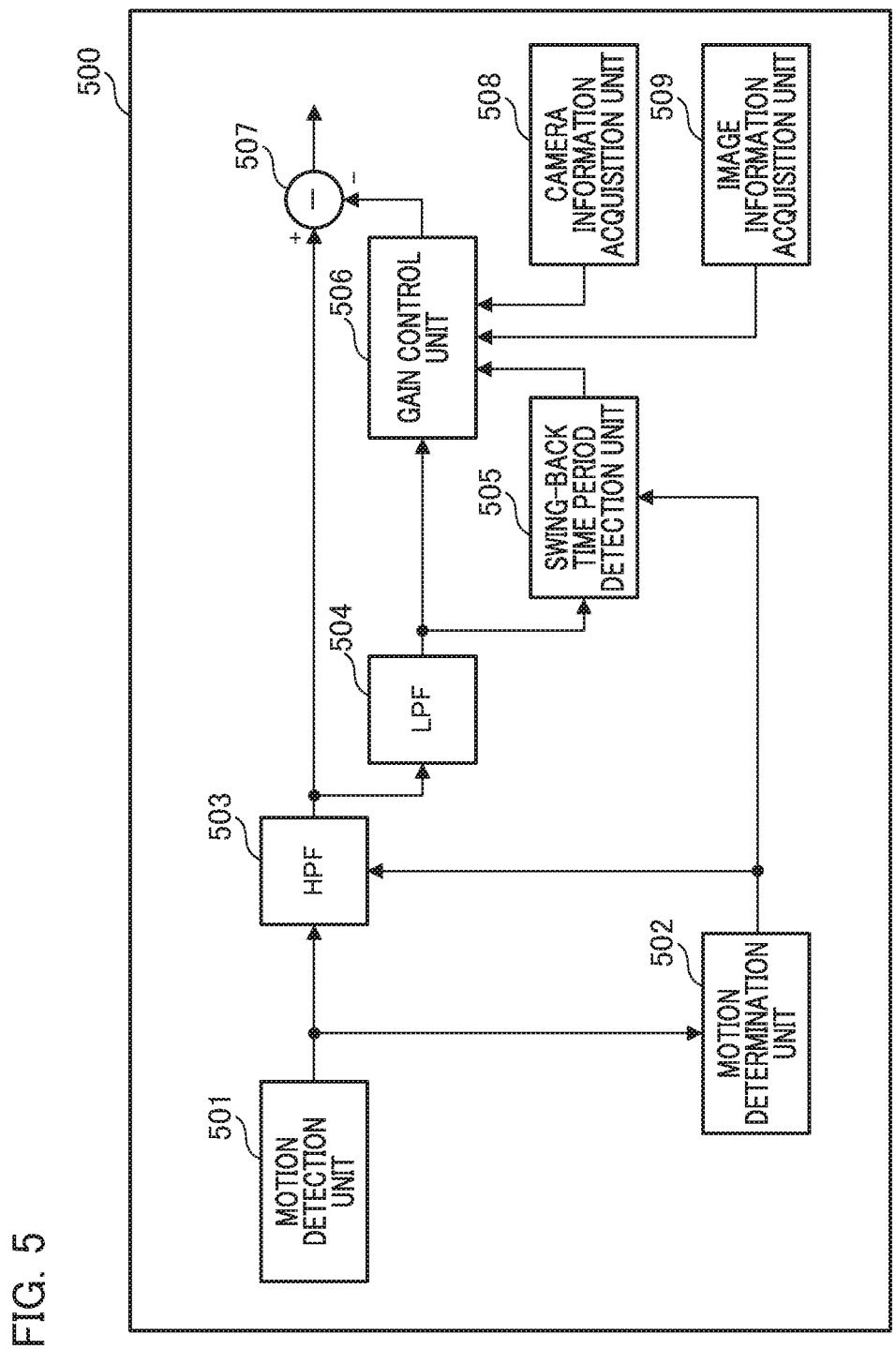
FIG. 5 is a block diagram illustrating an apparatus configuration according to the second embodiment of the present invention.

Next, the second embodiment of the present invention will be described. In the following, parts that are different from those in the first embodiment will be described. FIG. 5 is a block diagram illustrating a configuration of an image blur correction device 500 of the present embodiment.

The same reference numerals obtained by adding 400 to the reference numerals of the components shown in FIG. 1 are used for the components that are the same as the components in the configurations as those in the first embodiment, and a detailed description thereof is omitted.

A camera information acquisition unit 508 acquires camera information that is necessary for detecting a shooting state. The camera information is, for example, tripod determination information indicating a determination result with respect to whether or not the camera body is fixed to the tripod, and information about the magnitude of camera shake, a focal length, and a distance from the camera to the main object. An image information acquisition unit 509 acquires information that is necessary for detecting an amount of motion of the main object in the captured image.

A gain control unit 506 in the present embodiment performs gain control by using the information detected by a period time detection unit 505 and each information from the camera information acquisition unit 508 and the image information acquisition unit 509. The gain control unit 506 multiplies the output signal of the LPF 504 by a gain, based on these pieces of information, and outputs the result to a subtraction processing unit 507. Note that in the present embodiment, a motion detection unit 501 detects a motion of the imaging apparatus by using an angular velocity sensor and the like, and a controller configured by at least one CPU functions as a motion determination unit 502, an HPF 503, the LPF 504, the period time detection unit 505, the gain control unit 506, the subtraction processing unit 507, the camera information acquisition unit 508, the image information acquisition unit 509, and a correction control unit.

Figure 6:
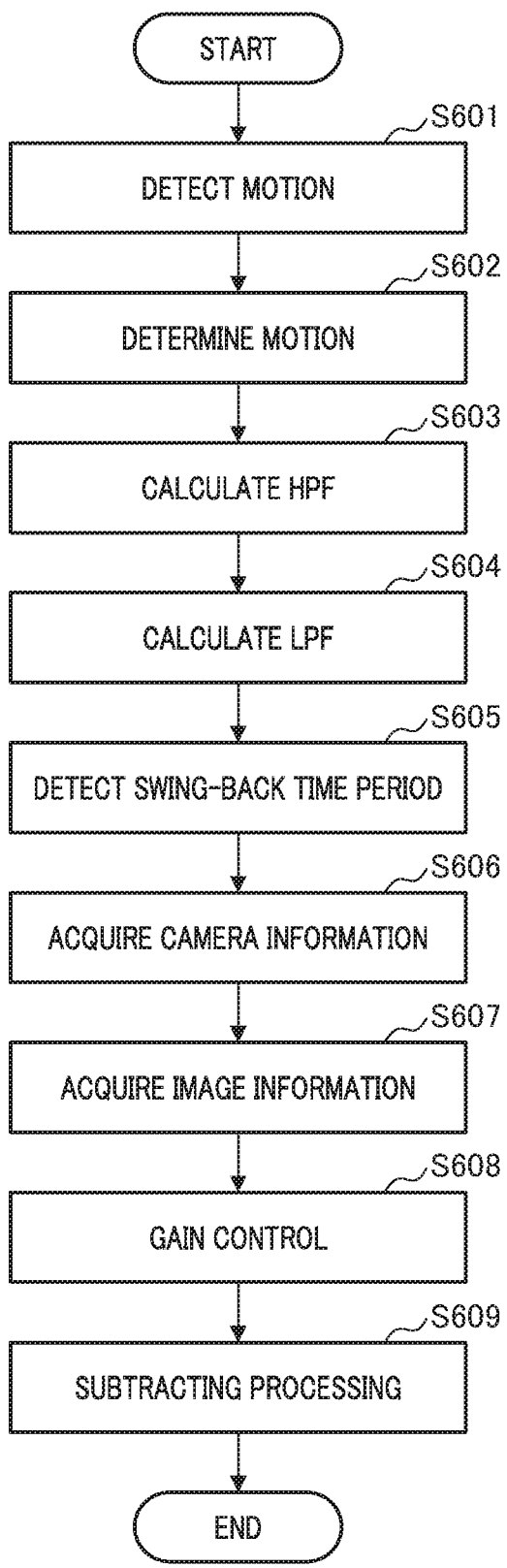
FIG. 6 is a flowchart that illustrates image blur correction processing according to the second embodiment.

With reference to the flowchart shown in FIG. 6, the processing performed by the image blur correction device 500 will be described. Since the processes shown in steps S601 to S605 and S609 in FIG. 6 are the same as those shown in steps S201 to S205 and S207 in FIG. 2, the description thereof will be omitted and the processes in steps S606 to S608 will be described.

In step S606, which follows step S605, the camera information acquisition unit 508 acquires camera information that is necessary for estimating a shooting state. In step S607, the image information acquisition unit 509 acquires information that is necessary for estimating an amount of motion of the main object in the image to estimate the amount of motion of the main object. Any method may be used for the method for estimating the amount of motion. For example, there is a method for estimating the amount of motion by detecting the main object by using face detection or the like, and calculating a motion vector based on a moving amount between frames of the main object.

In step S608, the gain control unit 506 performs gain control based on the information detected by the period time detection unit 505 and each information of the camera information acquisition unit 508 and the image information acquisition unit 509. The gain control unit 506 determines whether a priority should be given to the image blur correction or the swing-back correction depending on whether the motion due to the swing-back or the motion due to other causes is more conspicuous, and multiplies the output signal of the LPF 504 by a gain. Increasing the gain value causes the swing-back correction component to increase, which means that more priority is given to the swing-back correction than the image blur correction. The relation between the camera information, the image information, and the gain G will be described below.

During a period of time other than the swing-back rime period, the gain control unit 506 sets G=0, regardless of the camera information and the image information, in accordance with the output of the period time detection unit 505. In contrast, during the swing-hack time period, gain control is performed in accordance with the camera information and the image information. First, the relation between the tripod determination information and the gain G will be described. If it is determined that the tripod is used, the camera shake is small and the motion due to the swing-back is more conspicuous, so that the setting of increasing the gain value is performed in order to give more priority to the swing-back correction than the image blur correction. For example, G=1 is set if it is determined that the tripod is used, and G=0.5 is set if it is determined that the tripod is not used.

Next, the relation between the magnitude of camera shake and the gain G will be described. As the amount of the camera shake decreases, the motion due to the swing-back becomes relatively more conspicuous, so the setting of increasing the gain value is performed in order to give more priority to the swing-back correction than the image blur correction. An example of the association between the magnitude of the camera shake and the gain G will be described with reference to FIG. 7A. The horizontal axis represents a magnitude of the camera shake and the vertical axis represents a gain value.

Figure 7A:
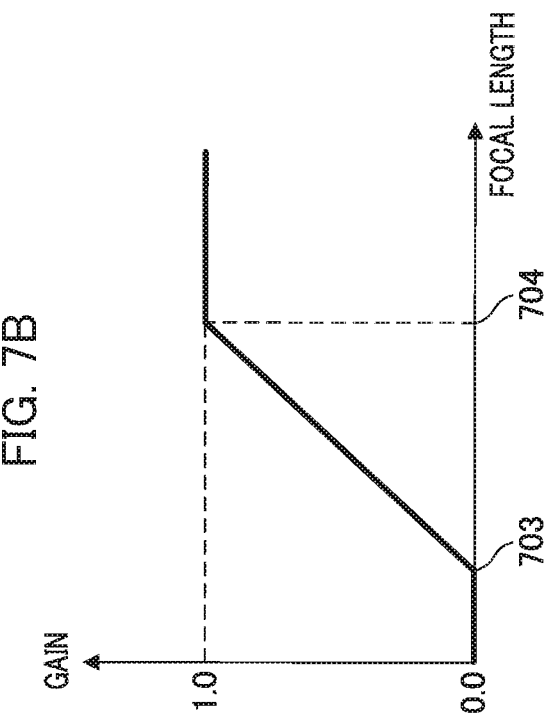
FIGS. 7A to 7D illustrate the relation between a shooting state and a gain.

FIG. 7A illustrates an example in which the first threshold 701 and the second threshold 702 are set. If the magnitude of the camera shake is equal to or smaller than the threshold 701, G=1 is set, and if the magnitude of the camera shake is equal to or larger than the threshold 702. G=0 is set. The thresholds 701 and 702 are determined depending on which motion is more conspicuous, the motion caused by the camera shake or the motion caused by the swing-back. The example of FIG. 7A shows that, in the interval from the threshold 701 to the threshold 702, the gain value decreases in a linear relation as the amount of the camera shake increases. The present invention is not limited to this example, and the magnitude of the camera shake and the gain may be associated with each other in a non-linear relation.

Figure 7B:
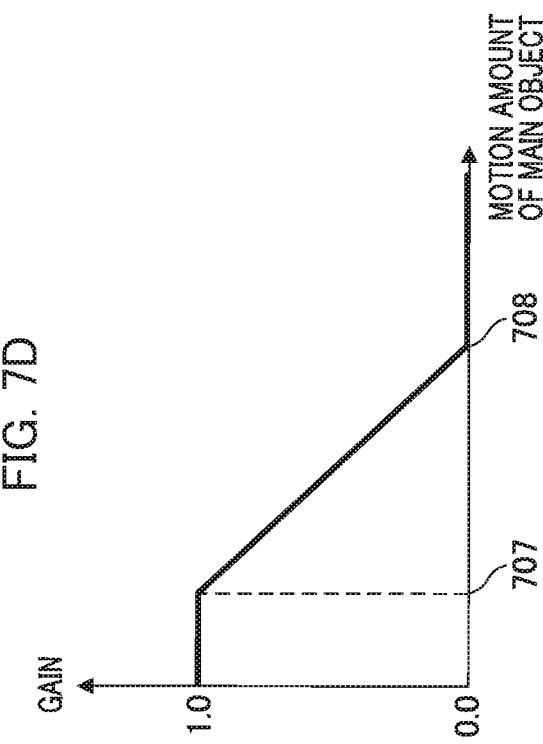

With reference to FIG. 7B, the relation between the focal length of the imaging optical system and the gain G will be described. As the focal length increases, the amount of motion on the screen increases with respect to the amount of the motion of the image blur correction member. Accordingly, even if the same panning operation is performed, the motion due to the swing-back becomes conspicuous as the focal length increases. Hence, the gain control unit 506 sets a large gain value so that the effect of the swing-back correction is more exhibited as the focal length increases. FIG. 7B illustrates an example of the association between the focal length and the gain G. The horizontal axis represents a focal length and the vertical axis represents a gain value.

FIG. 7B illustrates an example in which the first threshold 703 and the second threshold 704 are set. G=0 is set if the focal length is equal to or less than the threshold 703, and G=1 is set if the focal length is equal to or more than the threshold 704. The thresholds 703 and 704 are determined depending on which motion is more conspicuous, the motion caused by the camera shake or the motion caused by the swing-back. In the example of FIG. 7B, the gain value increases in a linear relation as the focal length increases in the interval from the threshold 703 to the threshold 704. The present invention is not limited to this example, and the focal length and the gain may be associated with each other in a non-linear relation.

Figure 7C:
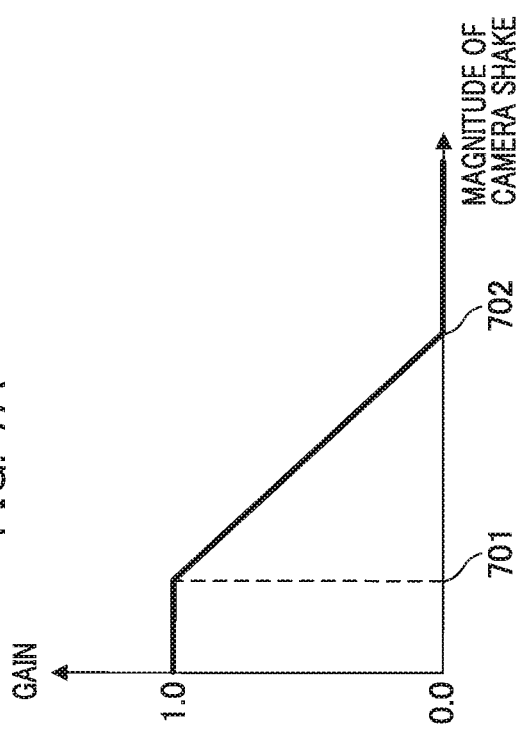

The relation between a main object distance and the gain G will be described with reference to FIG. 7C. The main object distance is a distance between the main object that is emphasized by a user in the image and the imaging apparatus. As the main object distance decreases, the ratio of the image of the main object occupying the screen increases, so that the motion of the main object due to the swing-back becomes conspicuous. Accordingly, the gain control unit 506 sets a large gain value so that the effect of the swing-back correction is more exhibited as the main object distance decreases. FIG. 7C illustrates an example of the association between the main object distance and the gain G. The horizontal axis represents a main object distance and the vertical axis represents a gain value.

FIG. 7C illustrates an example in which the first threshold 705 and the second threshold 706 are set. G=1 is set if the main object distance is equal to or smaller than the threshold 705, and G=0 is set if the main object distance is equal to or larger than the threshold 706. The thresholds 705 and 706 are determined depending on which motion is more conspicuous, the motion of the main object caused by the camera shake and the motion of the main object caused by the swing-back. In FIG. 7C, in the interval from the threshold 705 to the threshold 706, the gain value decreases in a linear relation as the main object distance increases. The present invention is not limited to this example and the main object distance and the gain may be associated with each other in a non-linear relation.

Figure 7D:
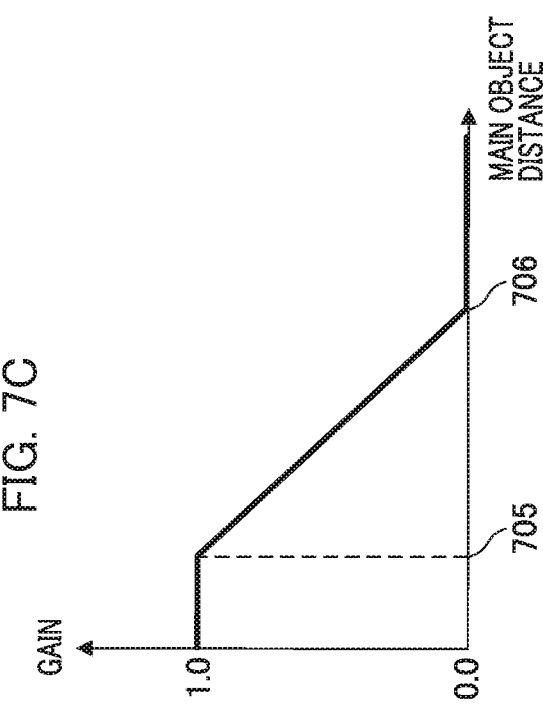

The relation between the amount of motion of the main object and the gain G will be described with reference to FIG. 7D. As the amount of motion of the main object increases, the motion of the main object becomes more conspicuous relative to the motion caused by the swing-back, leading to lowering the effect of the swing-back. Hence, as the amount of motion of the main object increases, the gain control unit 506 lowers the gain value to weaken the effect of the swing-back correction. FIG. 7D illustrates an example of the association between the amount of motion of the main object and the gain G. The horizontal axis represents an amount of motion of the main object and the vertical axis represents a gain value.

FIG. 7D illustrates an example in which the first threshold 707 and the second threshold 708 are set. G=1 is set if the amount of motion of the main object is equal to or less than the threshold 707, and G=0 is set if the amount of motion of the main object is equal to or more than the threshold 708. The thresholds 707 and 708 are determined depending on which motion is more conspicuous, the motion of the main object itself or the motion of the main object caused by swing-back. In FIG. 7D, in the interval from the threshold 707 to the threshold 708, the gain value decreases in a linear relation as the amount of motion of the main object increases. The present invention is not limited to this example, and the amount of motion of the main object and the gain may be associated with each other in a non-linear relation.

Next, weighted addition of gain values will be described. It is assumed that the information for estimating which is more conspicuous, the motion caused by the swing-back or the motion caused by another cause, has a plurality of pieces of information. The gain control unit 506 performs weighted addition to each gain value obtained for each piece of acquired information to calculate a final gain value. For example, gains obtained from a panning speed, tripod determination, a magnitude of camera shake, a focal length, a main object distance, and an amount of motion of the main object are respectively denoted by Ga, Gb, Gc, Gd, Ge, and Gf, and their weights are respectively denoted by Wa, Wb, Wc, Wd, We, and Wf. These weights correspond to coefficients used for the weighted addition calculation, and the sum of the weights W (=Wa+Wb+Wc+Wd+We+Wf) is 1. The final gain G is calculated by the following formula (1).

$$G = W_a * G_a + W_b * G_b + W_c * G_c + W_d * G_d + W_e * G_e + W_f * G_f \quad (1)$$

The weight is set based on, for example, the certainty of the information source corresponding to each gain. If the certainty of each information source is the same or unknown, all weights should be set the same.

In contrast, there is a method for determining the priority order of gains. In the method based on the priority, a priority order is given to each piece of obtained information or a gain corresponding thereto, and a gain having a high priority is adopted. For example, if the camera shake is large, the motion due to the swing-back is concealed in the camera shake regardless of the panning speed. Hence, the gain control unit 506 makes the priority order for the magnitude of the camera shake higher than the panning speed. Additionally, if the panning speed is slow, the motion due to swing-back is small regardless of the focal length. Therefore, the gain control unit 506 makes the priority order for the panning speed higher than the focal length. In this example, the priority order is set in the order of the magnitude of camera shake, the panning speed, and the focal length. According to the present embodiment, gain control in accordance with the camera information and image information is performed during the swing-back time period, and the swing-back correction and the image blur correction can be made compatible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-194836, filed Oct. 16 2018, which is hereby incorporated by reference wherein in its entirety.

What is claimed is:

1. An image blur correction device that corrects the image blur of an image comprising:
   a controller having a processor that executes instructions stored in a memory or having circuitry, the controller being configured to function as:
   a first filtering unit configured to reduce a low-frequency component of an output of a detector that detects a motion of an apparatus provided with the image blur correction device;
   a second filtering unit configured to reduce a high-frequency component of the output of the first filtering unit;
   a detection unit configured to detect the start and end of a period of time during which a swing-back motion based on signal processing is generated, by using the output of the second filtering unit;
   a gain control unit configured to determine a gain based on an output of the detection unit, multiply the output of the second filtering unit by the gain, and output the result;
   a subtraction processing unit configured to subtract an output of the gain control unit from the output of the first filtering unit; and
   a control unit configured to perform control that corrects the image blur in accordance with an output of the subtraction processing unit.

2. The image blur correction device according to claim 1, wherein the controller further functions as a motion determination unit configured to determine a motion of the apparatus provided with the image blur correction device from the output of the detector and output a determination signal to the gain control unit; and
   wherein the detector outputs a detection signal of panning or tilting to the motion determination unit.

3. The image blur correction device according to claim 2, wherein the gain control unit sets a first gain value if a speed of panning or tilting is a first value, and sets a second gain value that is larger than the first gain value if the speed of panning or tilting is a second value that is larger than the first value.

4. The image blur correction device according to claim 2, wherein the gain control unit sets a first gain value if acceleration of panning or tilting is a first value, and sets a second gain value that is larger than the first gain value if the acceleration of panning or tilting is a second value that is larger than the first value.

5. An imaging apparatus comprising:
   an image sensor;
   a controller having a processor that executes instructions stored in a memory or having circuitry, the controller being configured to function as:
   a first filtering unit configured to reduce a low-frequency component of an output of a detector that detects a motion of the imaging apparatus;
   a second filtering unit configured to reduce a high-frequency component of an output of the first filtering unit;
   a detection unit configured to detect the start and end of a period of time during which a swing-back motion based on signal processing is generated by using an output of the second filtering unit;
   a gain control unit configured to determine a gain based on an output of the detection unit, multiply the output of the second filtering unit by the gain, and output the result;
   a subtraction processing unit configured to subtract an output of the gain control unit from the output of the first filtering unit; and
   a control unit configured to perform control that corrects the image blur of an image obtained by using the image sensor in accordance with an output of the subtraction processing unit.

6. The imaging apparatus according to claim 5, wherein the controller further functions as an acquisition unit configured to acquire information used for detecting a shooting state; and
   wherein the gain control unit determines the gain by using an output of the acquisition unit and the output of the detection unit.

7. The imaging apparatus according to claim 6, wherein the gain control unit sets a first gain value if the acquisition unit acquires information indicating that the imaging apparatus is attached to a tripod, and sets a second gain value that is smaller than the first gain value if the acquisition unit acquires information indicating that the imaging apparatus is not attached to the tripod.

8. The imaging apparatus according to claim 6,
wherein the gain control unit acquires information about an amount of shake of the imaging apparatus from the acquisition unit, sets a first gain value if the amount of shake of the image apparatus is a first value, and sets a second gain value that is smaller than the first gain value if the amount of shake of the image apparatus is a second value that is larger than the first value.

9. The imaging apparatus according to claim 6,
wherein the gain control unit acquires information about a focal length of an imaging optical system from the acquisition unit, sets a first gain value if the focal length is a first value, and sets a second gain value that is larger than the first gain value if the focal length is a second value that is larger than the first value.

10. The imaging apparatus according to claim 6,
wherein the gain control unit acquires distance information of an object from the acquisition unit, sets a first gain value if the distance information of the object is a first value, and sets a second gain value that is smaller than the first gain value if the distance information of the object is a second value that is larger than the first value.

11. The imaging apparatus according to claim 5,
wherein the controller further functions as an acquisition unit configured to acquire information to be used for detecting an amount of motion of an object in a captured image; and
wherein the gain control unit determines the gain by using an output of the acquisition unit and the output of the detection unit.

12. The imaging apparatus according to claim 11,
wherein the gain control unit acquires information about an amount of motion of an object from the acquisition unit, sets a first gain value if the amount of motion of the object is a first value, and sets a second gain value that is smaller than the first gain value if the amount of motion of the object is a second value that is larger than the first value.

13. The imaging apparatus according to claim 5,
wherein the gain control unit performs weighted addition to a plurality of calculated gains to determine the gain.

14. The imaging apparatus according to claim 5,
wherein the gain control unit determines the gain in accordance with the priority order for the calculated gains.

15. A control method executed by an image blur correction device that corrects the image blur of an image comprising:
detecting a motion of an apparatus provided with the image blur correction device by a detector;
reducing a low-frequency component of an output of the first detecting unit by a first filter;
reducing a high-frequency component of an output of the first filter by a second filter;
detecting the start and end of a period of time during which a swing-back motion based on signal processing is generated by using an output of the second filter;
determining a gain based on a detected period of time and multiplying the output of the second filter by the gain;
subtracting a multiplied output from the output of the first filter; and
performing control that corrects the image blur in accordance with a subtracted output.

* * * * *